United States Patent [19]
Sakai et al.

[11] Patent Number: 6,105,443
[45] Date of Patent: Aug. 22, 2000

[54] DUMMY SOUND ABSORBER REPRESENTING A SEATED HUMAN FOR MEASURING SOUND ABSORPTION POWER OF A THEATER CHAIR

[75] Inventors: Takeshi Sakai; Kawakami Fukushi, both of Hamamatsu, Japan

[73] Assignee: Yamaha Corporation, Hamamatsu, Japan

[21] Appl. No.: 08/466,109

[22] Filed: Jun. 6, 1995

Related U.S. Application Data

[62] Division of application No. 08/129,261, Sep. 30, 1993, Pat. No. 5,465,469.

[30] Foreign Application Priority Data

| Oct. 1, 1992 | [JP] | Japan | 4-286589 |
| Sep. 21, 1993 | [JP] | Japan | 5-257595 |

[51] Int. Cl.$^7$ ................................................. B23Q 17/00
[52] U.S. Cl. ............................................................ 73/865.6
[58] Field of Search ................................... 73/589, 865.1, 73/865.3, 865.4, 866.4, 865.6; 29/404, 407; 434/268–275

[56] References Cited

U.S. PATENT DOCUMENTS

3,841,163 10/1974 Daniel .
4,362,222 12/1982 Hellstrom ................................. 181/30
4,701,132 10/1987 Groesch et al. .
4,739,513  4/1988 Kunugi et al. ........................... 381/103
5,018,977  5/1991 Wiley et al. .
5,095,506  3/1992 Kikuno ..................................... 381/24

*Primary Examiner*—Robert Raevis
*Attorney, Agent, or Firm*—Pillsbury Madison & Sutro LLP

[57] ABSTRACT

There is provided a method for measuring a sound absorption power of a theater chair with a human being seated thereon. The method includes steps of disposing a theater chair which is an object of measurement in a measuring environment; disposing a dummy sound absorber in the theater chair, the dummy sound absorber having a shape in which it is in contact with the theater chair, a sound absorption power and a chair pressing force in such a manner that the dummy sound absorber simulates a human being seated on the theater chair; causing changes in the theater chair which changes are substantially equivalent to a change in the state of the theater chair caused when a human being gets seated on the chair and a change in the sound absorption power of the theater chair caused by seating of the human being thereon; and measuring the sound absorption power of the theater chair. There is also provided a dummy sound absorber used for carrying out this method.

2 Claims, 11 Drawing Sheets

CHAIR A

FIG. 5A

CHAIR B

DUMMY SOUND ABSORBER REPRESENTING A SEATED HUMAN FOR MEASURING SOUND ABSORPTION POWER OF A THEATER CHAIR

This is a divisional of application Ser. No. 08/129,261, filed Sep. 30, 1993, now U.S. Pat. No. 5,465,469.

BACKGROUND OF THE INVENTION

This invention relates to a method for measuring sound absorption power of a theater (hall) chair with a human being seated thereon and a sound absorption dummy used for this method and, more particularly, to the method and dummy which can measure sound absorption capacity of a hall chair in such a state easily and accurately.

A sound absorption characteristic of a chair in a theater or auditorium (hereinafter referred to as "theater chair") is a very important factor in the acoustic designing of a theater. It has generally been customary in the past to measure a sound absorption characteristic of a hall chair per se in a state wherein a human being is not seated on the chair. The sound absorption characteristic of a hall chair should however be measured in a state wherein a human being is seated on the chair in question.

It has recently been proposed to provide a theater chair with a constant sound absorption power intended to enable an acoustic characteristic of a hall to remain unchanged between a state wherein a human being is seated on the hall chair and a state wherein he is not seated thereon (e.g., as described in the specification and drawings of Japanese Utility Model Application No. Hei 4-45924 filed by the assignee of the present invention). In designing such a hall chair, it is necessary to measure not only the sound absorption characteristics during an unseated state but also those during a seated state.

In a case where a sound absorption characteristic of a hall chair during a seated state is to be measured, a measurement is made under the condition that a human being is actually seated on the hall chair.

The method according to which the sound absorption characteristic is measured with a human being seated on the theater chair however has the following inconveniences:

1. Reliability and reproducability of a measured value are not adequate. Since the posture of the person seated on the hall chair differs from person to person and since presence of a human being affects temperature and since humidity of the chamber (hall) in which the measurement is made, these factors cause measurement errors. Further, movement and posture of a human being and the clothing he wears during the measurement also affect the measurement very much.
2. It is difficult to compare results of the plural measurements with each other for the reasons described above in 1.
3. The measurement is an unpleasant experience for the human being seated on the hall chair and this causes the inconvenience described above in 1.
4. It is a troublesome task to collect ten to twenty persons at one time to be measured at one time.

It is, therefore, an object of the invention to provide a method for measuring a sound absorption capacity capable of easily and accurately measuring a sound absorption capacity of a hall chair with a human being seated thereon and provide also a sound absorption dummy used for this method.

SUMMARY OF THE INVENTION

A method for measuring a sound absorption power of a theater chair with a human being seated thereon achieving the above described object of the invention comprises steps of disposing a chair which is an object of measurement in a measuring environment; disposing a dummy sound absorber in the chair, said dummy sound absorber having a shape in which it is in contact with the chair, a sound absorption power and a chair pressing force in such a manner that the dummy sound absorber simulates a human being seated on the chair; causing changes in the chair which changes are substantially equivalent to the changes in the state of the chair caused when a human being gets seated on the chair and a change in the sound absorption power of the chair caused by seating of the human being thereon; and measuring the sound absorption power of the chair.

A dummy sound absorber used for measuring a sound absorption power of a chair with a human being seated thereon comprises a chair contacting portion having a shape which is substantially equivalent to the shape of portions of a human being which are in contact with a seat and a back of the chair when the human being is seated on the chair, sound absorption power generation means for generating a sound absorption power which is substantially equivalent to the sound absorption power formed by a human body when the human being wearing clothing is seated on the chair, and pressing force generation means for generating a weight or a force equivalent to the weight for imparting a pressing force which is substantially equivalent to a pressing force imparted by the human body to the seat surface and the back of the chair when the human being is seated on the chair.

According to the invention, measurement is performed by disposing in the chair a dummy sound absorber having a shape in which it is in contact with the chair, a sound absorption power and a chair pressing force in such a manner that the dummy sound absorber simulates a human being seated on the chair and, hence, results of measurement which are substantially equivalent to those of measurement conducted when a human being is seated on the chair can be obtained. Moreover, since the seating condition can be standardized and an immobile posture can be maintained, as compared to a case where a human being is seated on the chair, and since the disposition of the dummy in no way affects temperature and humidity of the measuring environment, data available when a human being is seated under standard conditions can be obtained. As a result, reliability and reproducability of the measurement of the sound absorption power can be maintained. Further, data of chairs of different specifications can be compared with each other with accuracy. Furthermore, since it is not necessary to collect many persons to be measured, the measurement can be made at any time and with great ease.

Further, according to the invention, in designing a theater chair with a constant sound absorption power, difference in the acoustic characteristic of the theater between the seated state and the empty state can be minimized by measuring the sound absorption power in the seated state and that in the empty state and designing the theater chair on the basis of the result of the measurement.

Preferred embodiments of the invention will now be described with reference to the accompanying drawings.

BRIEF DESCRIPTION OF THE DRAWINGS

In the accompanying drawings,

FIGS. 11A and 11B are diagrams showing an embodiment of the dummy sound absorber according to the invention in which FIG. 11A is a front view and FIG. 11B is a side view;

DESCRIPTION OF PREFERRED EMBODIMENTS

Figure 1A:
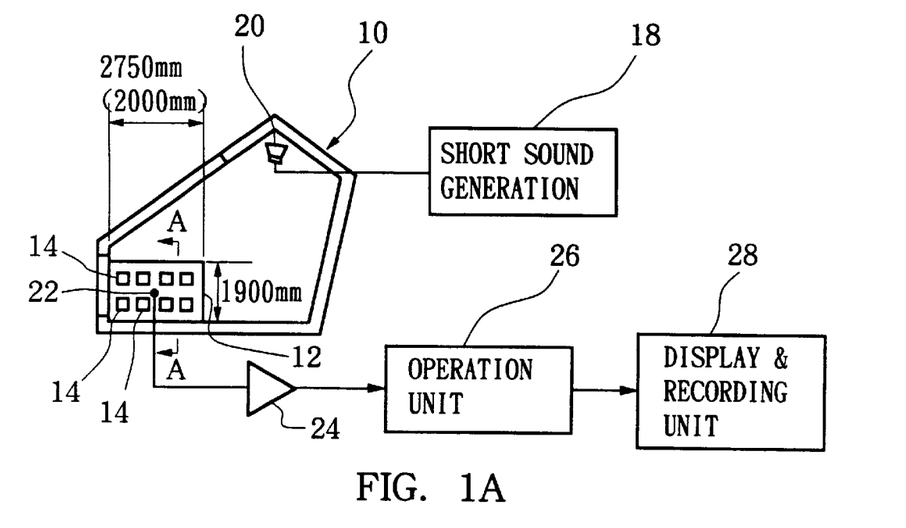
FIGS. 1A and 1B are diagrams showing an embodiment of the method for measuring a sound absorption power according to the invention.
Figure 1B:
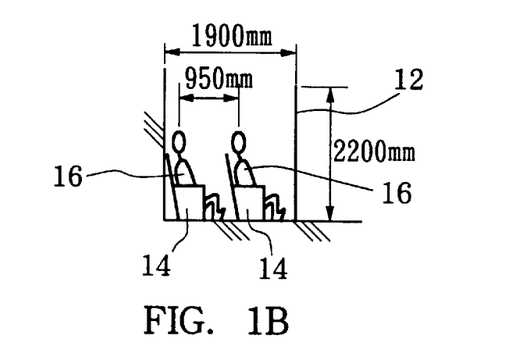

FIGS. 1A and 1B show an embodiment of a device for carrying out the method for measuring a sound absorption capacity in which FIG. 1A shows a reverberation chamber 10 in a plan view and FIG. 1B is an elevational view as viewed in the direction of lines A—A. In this embodiment, "PLD/Deep-well method" is employed. According to this method, the random incident sound absorption coefficient α∞ can be measured rationally without being affected by dispersion condition and an area effect (edge effect) of the reverberation chamber. In this method, the area effect is removed by enclosing, in a reverberation chamber, a sound absorbing sample with an acrylic plate (deep-well) which is higher than the sound absorbing sample, and non-diffused condition which is thereby enhanced is measured quantitatively as a curvature of a reverberation characteristic curve. The random incident sound absorption rate α∞ is measured accurately by estimating (by PLD correction) an average sound absorption capacity of Sabine on the basis of the initial attenuation rate of the non-dispersion condition. As regards the theory of the Deep-well method, reference is made to Technical Report vol. 91, No. 329, November 1991, EA91-69 of Electronic Information Communication Society of Japan as well as Japanese Patent Application Laid-open No. Hei 3-276031.

In the embodiment of FIGS. 1A and 1B, parameters of the reverberation chamber 10 (the measuring environment) are determined, for example, as follows:

capacity=267.6 m$^3$ surface area=249.2 m$^2$ floor area=34.3 m$^2$ $f_{min}$=115 Hz In the reverberation chamber 10 is provided a well 12 and in this well 12, there are provided, as best seen in FIG. 1B, a plurality of hall chairs 14 which are objects of measurement. In each hall chair 14 is disposed a sound absorption dummy 16 in a seated state. The sound absorption dummy is constructed so that it has a shape in which it is in contact with the hall chair 14, a sound absorption capacity and a chair pressing force in such a manner that the dummy 16 simulates a human being seated on the hall chair 14. By this arrangement, changes, which are substantially equivalent to a change in the state (shape) of the hall chair 14 caused when a human being is seated on the hall chair 14 and to a change in the sound absorption capacity of the hall chair 14 caused by the seating of the human being thereon, are brought about in the hall chair 14 and thereby the sound absorption capacity of the hall chair 14 can be measured under these conditions.

In FIG. 1A, a short sound generation unit generates a tone burst (impulsive sound) as the sound source used for the measurement and the tone burst is sounded from a loudspeaker 20 provided in the reverberation chamber 10. A microphone 22 is provided in the reverberation chamber 10 for collecting or picking up sound waves which are propagated from the loudspeaker 20 and reflected from the walls of the reverberation chamber 10.

Figure 2:
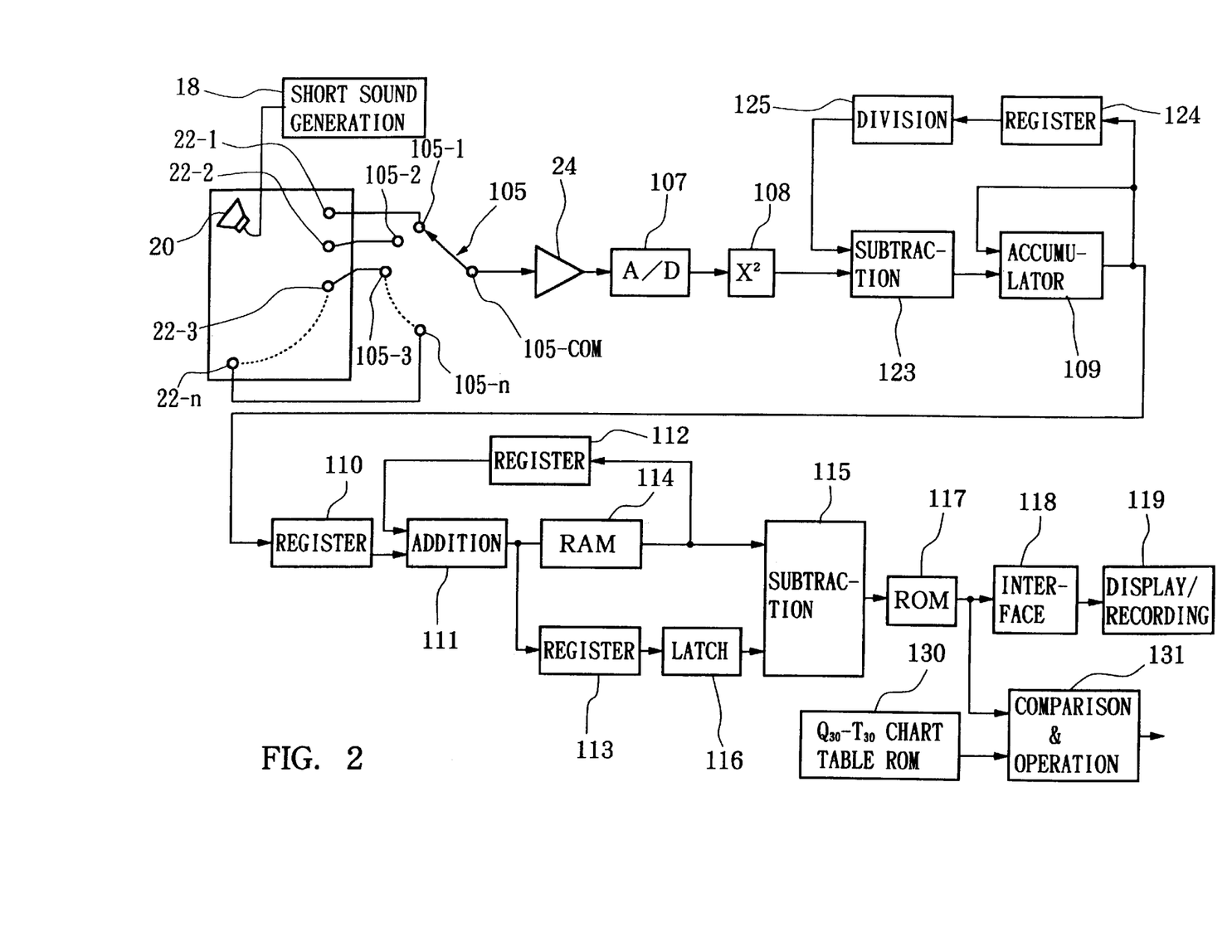
FIG. 2 is a block diagram showing a specific example of an operation unit 26 shown in FIG. 1A.

The sound collected by the microphone 22 is transmitted to an operation unit 26 through an amplifier 24. The operation unit performs measurement of a sound absorption capacity for each frequency. Results of the measurement such as a sound absorption power and a reverberation curve, are supplied to a display and recording unit 28 for display on a CRT screen and printing out of the results. A specific example of the operation unit 26 is shown in FIG. 2. This operation unit is one in which spatial ensemble average of reverberation when the sound source (tone burst) is cut off is calculated with respect to both a case where the reverberation chamber 10 is empty and a case where the theater chair 14 and the Deep-well 12 are arranged in the chamber 10, the degree of curvature is obtained by comparing the respective reverberation waveforms with theoretical values, reverberation times T0 and T1 to the attenuation rate of linear attenuation in a perfect diffusion sound field is obtained from the degree of curvature, and the sound absorption power is calculated on the basis of T0 and T1.

In FIG. 2, in the state before generation of an impulse, noise n(x) in the reverberation chamber 10 is collected by any of microphones 22-1 to 22-n and, after being converted to a digital signal by an analog-to-digital converter 107 through an amplifier 24, is squared by a squaring circuit 108. The output n$^2$(x) is cumulatively added by an accumulator 109 to obtain $\int n^2(x)dx$. This result of multiplication is divided by time of accumulation τ by a division circuit 125, through a register 124, to obtain an average value of squaring of the noise n(x), i.e., result of squaring value $n_{eff}$ of the effective value of the noise n(x).

Then, before generation of a first impulsive sound from a loudspeaker 20, a common terminal 105-COM of a switch 105 is connected to a contact 105-1, and the accumulator 109, a RAM 114 and a register 112 are cleared. Upon generation of impulsive sound from the loudspeaker 20 by a tone burst generator 18, the microphone 22-1 collects a sum (R(x)=r1(x)+n(x)) of this impulse r1(x) and the noise n(x) in the reverberation chamber 10. This sum R(x) is converted to a digital signal by an analog-to-digital converter 107 and squared by the squaring circuit 108 to provide $R^2(x)$. The square $n^2(x)$ of the effective value of the noise n(x) is subtracted from $R^2(x)$ to provide $R^2(x)-n^2_{eff}$ by subtraction circuit 123. This result of the subtraction is cumulatively added by an accumulator 109 to provide $\int_0^t [R^2(x)-n^2 eff]dx$. The result of the accumulation is successively applied to a register 110 at a predetermined timing. Output of the register 110 is added to output of the register 112 by the addition circuit 111. The result of the addition is stored at a predetermined address in the RAM 114 and also is applied to a register 113.

In this case, each time a predetermined period of time has elapsed from the start of the measurement, the contents of the accumulator 109 are applied to the register 110. At a first timing, data (S1-1) in the accumulator 109 is applied to the register 110. Simultaneously, the data of address "1" of the RAM 114 is applied to the register 112. At this time, the RAM 114 is cleared and, accordingly, the value applied to the register 112 is "0". The data in the register 112 and the data (S1-1) in the register 110 are added together by the addition circuit 111 [i.e., S1-1+0]. The added data "S1-1" is rewritten at address "1" in the RAM 114 and also applied to a register 113. At the next timing, data (S1-2) of the accumulator 109 is applied to the register 110 and, thereupon, data (="0") at address "2" in the RAM 114 is applied to the register 112 and addition of [$S^1$-2+0] is made by the addition circuit 111. The result (S1-2) of the addition is written at address "2" in the RAM 114 and applied to the register 113. Subsequently, writing in the RAM 114 and the register 113 is made in the same manner to the end of the accumulation of the accumulator 109. That is, at a time point when writing at the end of the accumulation has been completed, data "S1-1" is written at address "1", "S1-2" at address "2", "S1-3" at address "3", . . . , "S1-m" at address "m" whereas data "S1-m" is written in the register 113.

In this manner, upon completion of the collection of impulse response r1(x) by the microphone 22-1, the common terminal 105-COM of the switch 105 is connected to a contact 105-2 and the accumulator 109 is cleared. Second impulse response r2(x) is sequentially processed in a similar manner to the above described processing from the loudspeaker 20.

Upon inputting of a first accumulated value (S2-1) in the register 110, data at address "1" in the RAM 114 (the data S1-1 is stored by the above described processing) is applied to the register 112 and an addition of [S2-1+S1-1] is made by the addition circuit 111. The result of the addition is applied again at address "1" of the RAM 114 and the register 113. Subsequently, in a similar manner, accumulated value of impulse response r2(x) is sequentially added to the data of the RAM 114 and the following data are sequentially stored in the respective addresses of the RAM 114:

at address 1: [S1-1+S2-1]
at address 2: [S1-2+S2-2]
at address 3: [S1-3+S2-3] . . .
at address m: [S1-m+S2-m]

Then, impulse responses r3(x), r4(x), . . . , rn(x) are sequentially collected by the microphones 22-3, 22-4 . . . and 22-n and their accumulated values are sequentially added to the contents of the RAM 114. Therefore, when all of the processing of n impulse responses r1(x), r2(x), . . . rn(x) has been completed, the data of the RAM 114 is as follows:

at address 1: [S1-1+S2-1+ . . . Sn-1=TS1]
at address 2: [S1-2+S2-2+ . . . Sn-2=TS2] . . .
at address m: [S1-m+S2-m+ . . . Sn-m=TSm]

Thus, data TSm is written in the register 113.

The data TSm of the register 113 is applied to one of the input terminals of a subtraction circuit 115 through a latch circuit 116. On the other hand, the data in the RAM 114 is sequentially read out and supplied to the other input terminal of the subtraction circuit 115. In the subtraction circuit 115, therefore, the following operations are sequentially performed:

[TSm−TS1=Z1], [TSm−TS2=Z2] . . .
[TSm−TSm=Zm]

The result Z1 to Zm of this operation represents spatial ensemble average $\{<S^2(t)>\}_{N0}$.

This space aggregation average $\{<S^2(t)>\}_{N0}$ includes an error due to deficiency of diffusion in a sound field and, therefore, a processing for eliminating this error is performed. More specifically, since the curve of the spatial ensemble average $\{<S^2(t)>\}_{N0}$ reflects deficiency of diffusion in the sound field in the attenuation process, it is necessary to obtain sound absorption capacity in a perfectly diffused sound field by compensating for lack of diffusion (deficiency in diffusion) by employing a parameter indicating the degree of the curvature. An operation for this purpose will now be described.

The result of operation Z1 to Zm of the above described spatial ensemble average is logarithmically compressed by a ROM 117 to obtain reverberation characteristic curve 10 log $\{<S^2(t)>\}_{N0}$. This reverberation curve is applied to an interface 118 to be timewise displayed on and/or recorded into a display/recording unit 119.

In a chart table ROM 130, plural curve data corresponding to theoretical values of reverberation curves are stored. The theortical values are expressed by $$Ln(t) = -4.34(N-1)ln(1+\bar{a}*t/N)$$

where N represents the number of independent points which can be determined on a specimen (i.e., chair 14) and which constitutes an index concerning the degree of the curvature which indicates that the curve is nearer to a straight line as this index becomes greater. Assuming that the area of the specimen is S and the reverberation wave length is $\lambda$, N can be approximated by $S/(\lambda/2)^2$; $\bar{a}$ represents an index concerning the attenuation rate of an initial portion of the reverberation curve; and t represents time.

As parameter of the curve of the theoretical values; $L_N(t)$, the following $t_{30}$ (time until the reverberation curve attenuates by 30 dB) and $Q_{30}$ (the degree of curvature of the reverberation curve) are used:

$t_{30} = (N(\exp(30/(4.34(N-1))-1))/\bar{a}$
$Q_{30} = 30/(N-3)$.

Figure 3:
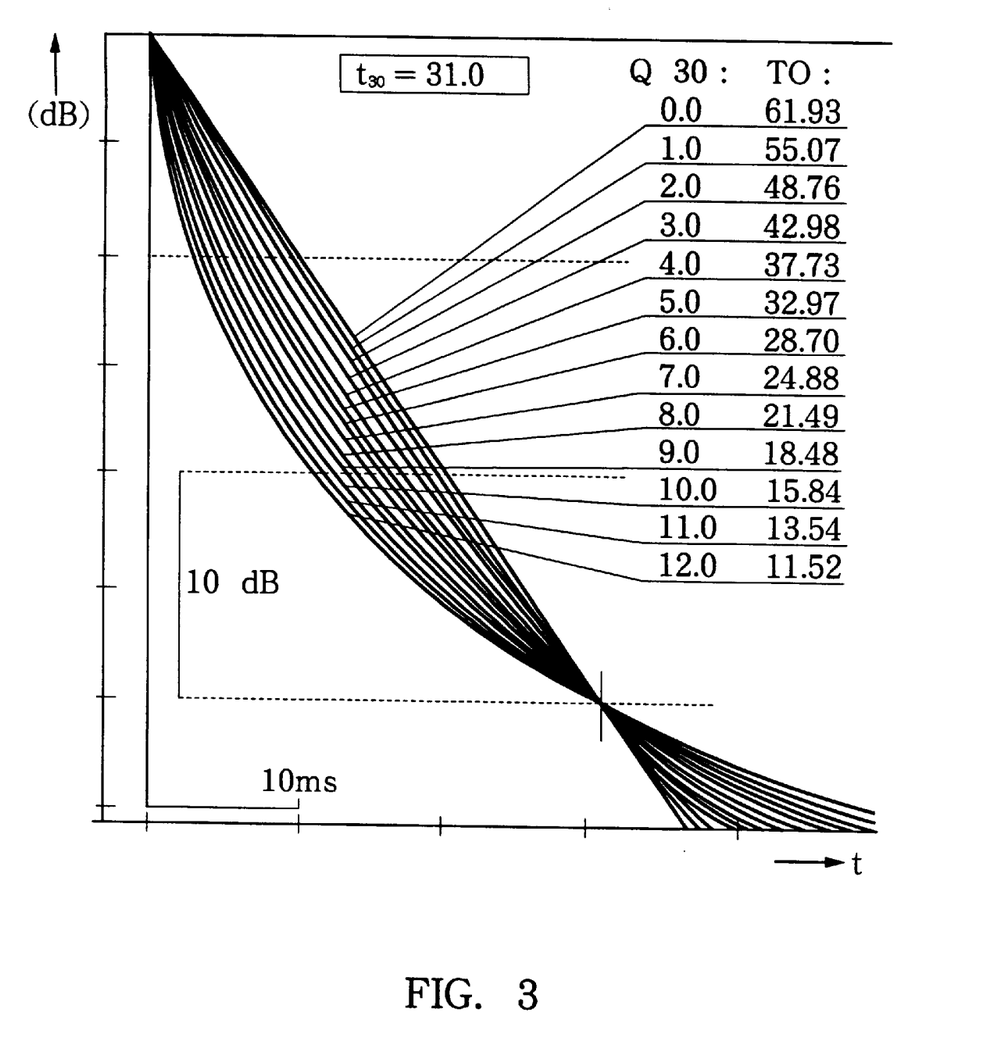
FIG. 3 is a graph showing an example of reverberation curves stored in a chart table ROM 130 of FIG. 2.

By way of example, curves of theoretical value $L_N(t)$ in the case of $t_{30}=31.0$ ms are shown in FIG. 3.

A comparison and operation circuit 131 compares a reverberation curve provided by the ROM 117 with the curves stored in the chart table ROM 130 and selects the nearest curve in the stored curve in the chart table ROM 130. Then, the circuit 131 calculates reverberation time $T_{N0}$ from the following formula by using $Q_{30}$ and $t_{30}$ of the selected curve:

$$T_{N0} = (13.8 Q_{30} t_{30})/(30(\exp(Q_{30}/4.34)-1)).$$

Further, on the basis of this $T_{N0}$ obtained, reverberation time $T_{00}$ corresponding to the attenuation rate of linear attenuation in the perfectly diffused sound field (i.e., deficiency in diffusion has been eliminated) can be calculated by the following equation:

$$T_{00}=(N-1)T_{N0}/N.$$

This reverberation time $T_{00}$ is calculated with respect to a case where the reverberation chamber 10 is empty and also a case where the hall chair 14 and well 12 are provided in the reverberation chamber 10, and then respective calculated reverberation times are designated by $T_0$ and $T_1$. The sound absorption capacity of the hall chair 14 can be calculated from the following formula:

$$a_{00}=(55.3V/(c*n))(1/T1-1/T0)$$

where V represents the volume of the reverberation chamber 10, n represents the number of hall chairs 14 and c represents the velocity of sound.

Description will now be made about the sound absorption dummy 16 used for the method shown in FIGS. 1A and 1B. First of all, results of measuring characteristics under the condition that a human being is actually seated on the hall chair 14 by the measuring device shown in FIGS. 1A and 1B will be described. The measurement was conducted by using two different hall chairs (hereinafter referred to as "chair A" and "chair B") having different sizes and specifications as described below.

Chair A (four Chair A's are arranged in two lines)
  back: plywood 25t+urethane 30t to 100t
  seat: plywood 20t+urethane 20t
  (Width)×(Depth)×(Height)=500×685×850 (in mm)

Chair B (five Chair B's are arranged in two lines)
  back: plywood 21t+GW25t, 80 Kg/m$^3$
  seat: plywood 21t+GW25t, 80 Kg/m$^3$
  (Width)×(Depth)×(Height)=550×640×900 (in mm)

Adults wearing summer clothing (e.g., a sport shirt with half-length sleeves or similar clothing) or winter clothing (the summer clothing plus outfit for protection against the cold) participated in the measurement.

Figure 4:
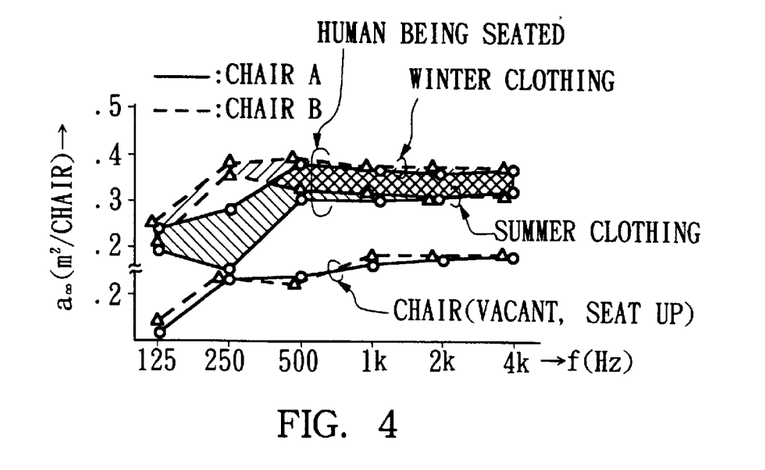
FIG. 4 is a graph showing results of measurement according to the method of FIGS. 1A and 1B.

Results of the measurement are shown in FIG. 4. Despite the great differences in the size and specification between chair A and chair B, the sound absorption power does not differ very much between chair A and chair B when no human being is seated thereon. When the human being is seated thereon, there is a difference ranging from 0.06 to 0.08 (m$^2$/chair) between chair A and chair B at frequencies over 250 Hz, i.e., at 500 Hz, 1 kHz, 2 kHz and 4 kHz, depending upon the clothing worn by the human being. At 250 Hz, there is a great difference between chair A and chair B depending upon the clothing worn, indicating that the sound absorption characteristic sometimes differs when a human being is seated in two chairs having similar sound absorption characteristics.

Figure 5A:
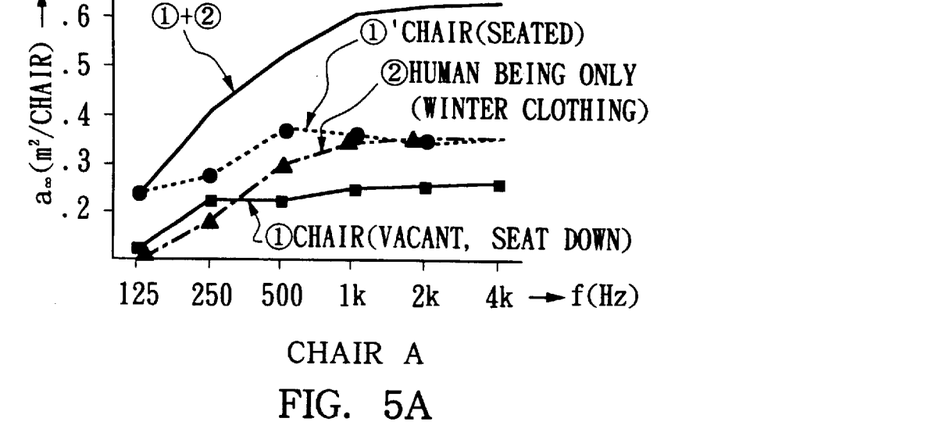
FIGS. 5A and 5B are graphs showing results of measurement according to the method of FIGS. 1A and 1B.
Figure 5B:
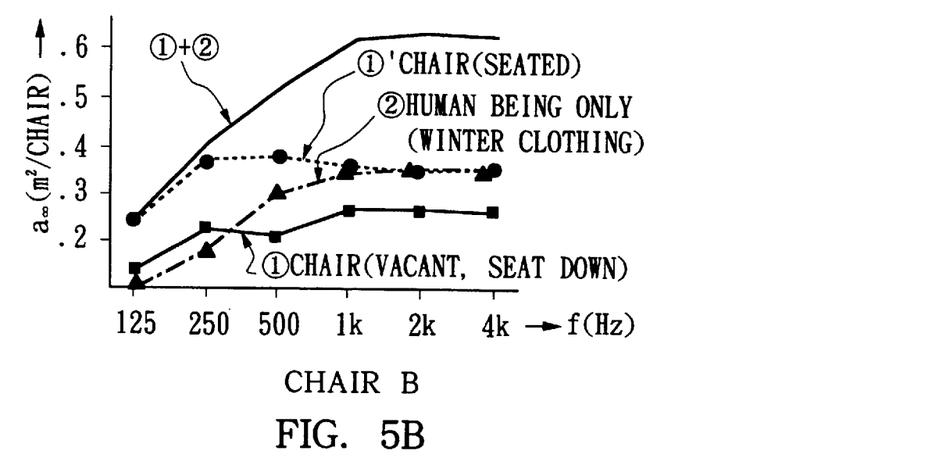

FIGS. 5A and 5B show results of measurement of the sound absorption power of the human being only and that of chair A or chair B only. Difference between the arithmetic sum of the sound absorption power of the human being and the sound absorption power of the chair A or B (indicated by the dotted line) represents decrease in the sound absorption power due to close contact of the human's body with the chair. This difference differs greatly at 250 Hz depending upon the type of the chair. Since chair A has a relatively thick back (30–100 mm), and the sound absorption power seems to decrease substantially due to compression of the back of the chair when the human being is seated on chair A as will be described later. On the other hand, the sound absorption power of chair B at 250 Hz when the human being is seated thereon is close to the arithmetic sum of the sound absorption power of the chair only and that of the human being only.

The above results of measurement in the case where the human being is actually seated on the chair indicate that consideration should be given both to the dummy sound absorber 16 only and too the state wherein the dummy sound absorber 16 is seated on the chair. As requirements for the dummy sound absorber 16, the following four factors should be considered:

(1) Size and power: The dummy should simulate an average adult person in size and shape.

(2) Material: The material of the dummy should be so selected that the surface of the dummy produces a sound absorption capacity which is substantially equivalent to what an adult person wearing clothing will produce.

(3) Weight: The dummy should have a weight sufficient for compressing the cushion of the chair to substantially the same degree as an adult person does.

(4) Mobility: The dummy should be in a close contact posture with the chair.

Figure 6:
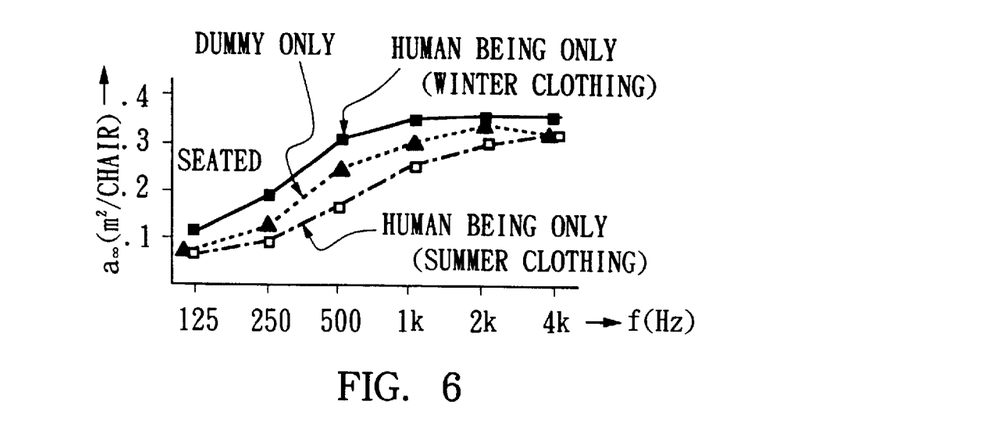
FIG. 6 is a graph showing results of measurement according to the method of FIGS. 1A and 1B.

Initially, for achieving the above factors (1) and (2), a dummy sound absorber was made of foamed polyurethane and partially finished with foamed polyurethane (having weight of about 5 kg) and the sound absorption power of this dummy only was measured. For achieving influence of the sound absorption characteristic of the chair, the measurement was conducted with the dummy seated on a round chair which hardly has any sound absorption power. Results of the measurement are shown with the sound absorption power of the human being only in FIG. 6. This dummy exhibits a sound absorption power which lies midway between the human being wearing summer clothing and the human being wearing winter clothing and therefore is preferable as a standard dummy sound absorber.

Figure 7A:
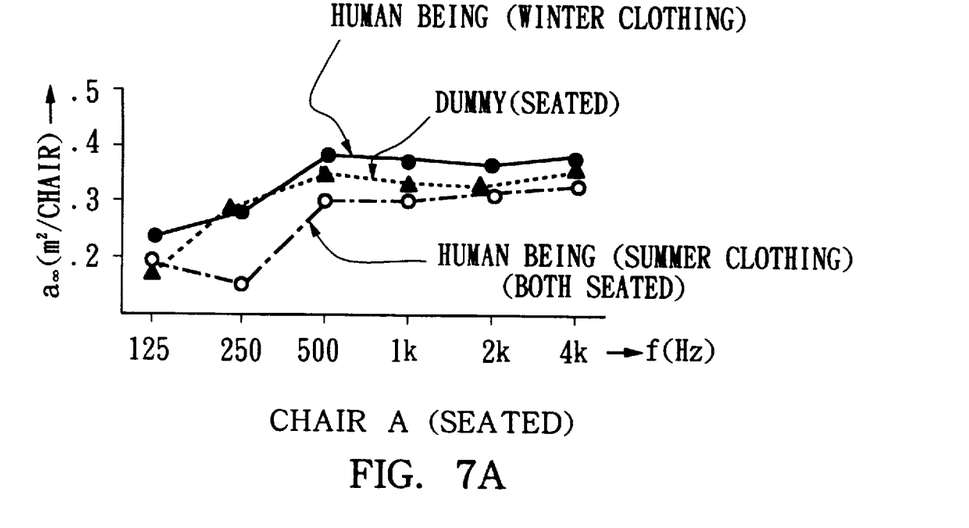
FIGS. 7A and 7B are graphs showing results of measurement according to the method of FIGS. 1A and 1B.
Figure 7B:
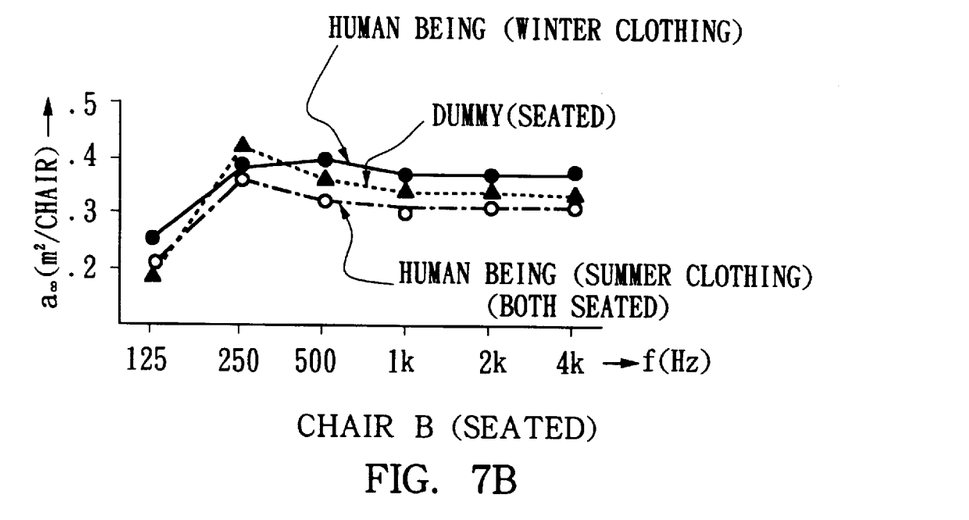

Then, measurement was conducted with this dummy being seated on chair A and chair B respectively. Results of the measurement are shown in FIGS. 7A and 7B. As in FIG. 6, the sound absorption power of the dummy being seated on chair A or B almost lies midway between that of the human being wearing summer clothing and that of the human being wearing winter clothing. At 250 Hz only, however, the dummy sound absorber exhibits a greater sound absorption power and, therefore, the dummy is still not sufficient. This effect seems to be attributable to the fact that the weight of the dummy sound absorber (about 5 kg) is different from that of the human being.

Figure 8A:
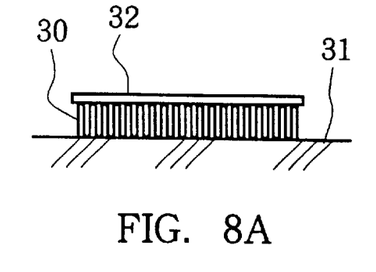
FIGS. 8A and 8B are diagrams showing methods of measuring influence of weight on the sound absorption capacity.
Figure 8B:
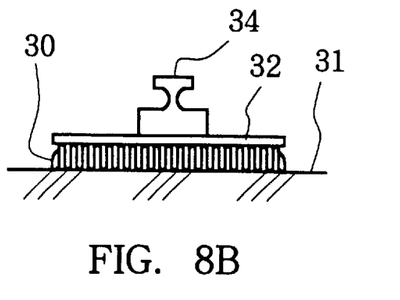
Figure 9:
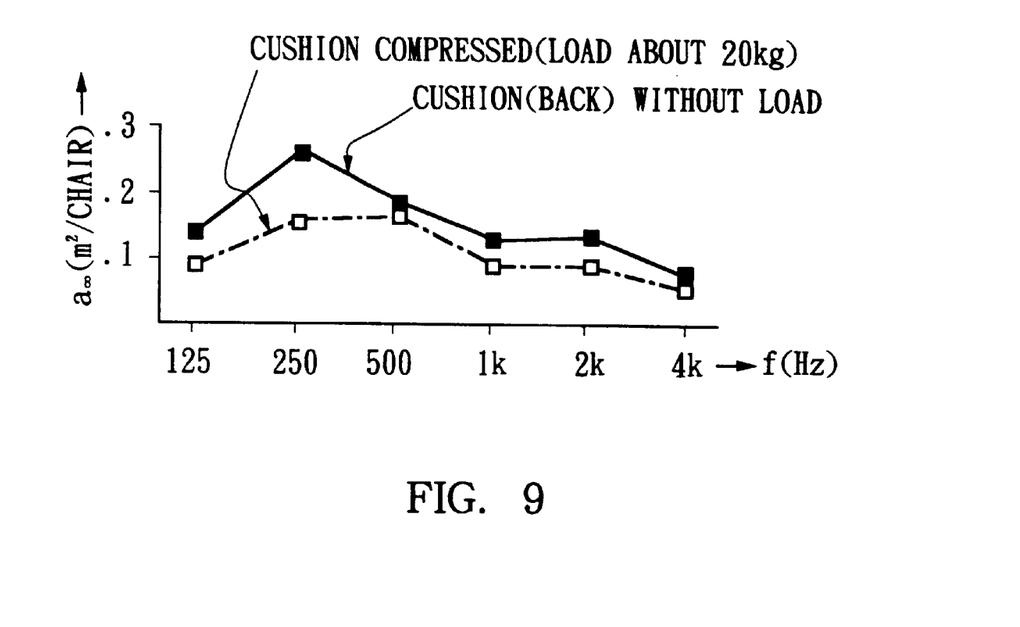
FIG. 9 is a graph showing results of measurement according to the methods of FIGS. 8A and 8B.

Accordingly, having regard to the above factor (3), influence of weight was examined. For this purpose, as shown in FIGS. 8A and 8B, measurement was conducted with respect to a case (a) where eight cushions 30 each constituting the back of the chair are disposed on a floor 31 of the well 12 in the reverberation chamber 10 and an acrylic plate 32 only is placed around cushion 30 and a case (b) where a weight 34 (about 20 kg which corresponds to the weight of the trunk of an adult male) is placed on top of the acrylic plate 32 to compress the cushion 30. Results of the measurement are shown in FIG. 9. In the case that there is no weight 34, the sound absorption capacity exhibits a peak value at 250 Hz. Whereas when the cushion 30 is compressed, this peak value no longer exists, indicating the importance of the above factor (3). This is also considered to be a main reason for decrease in the sound absorption power in the case of chair A shown in FIG. 5A.

Figure 10:
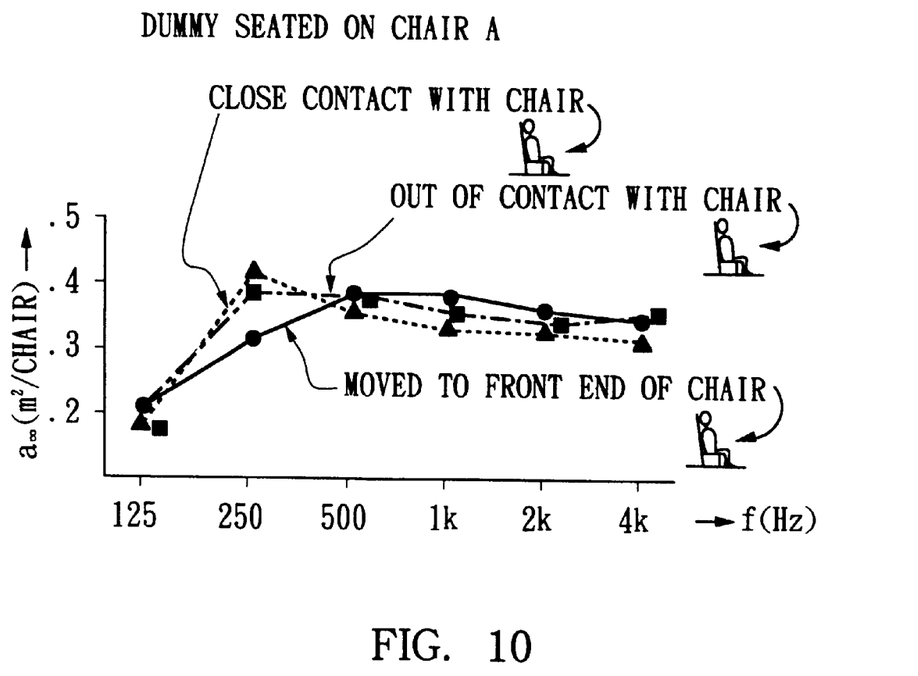
FIG. 10 is a graph showing results of measurement according to the method of FIGS. 1A and 1B.

Then, having regard to the above factor (4), influence of the seating position of a dummy sound absorber (one which materializes the above factor (1) and (2) having weight of about 5 kg) was examined. Results of the measurement are shown in FIG. 10. These results reveal that the sound absorption characteristic changes as the seating posture changes from a standard state in which both the back and thighs of the dummy are in close contact with the chair (indicated by the symbol ▲ in the figure), to a state in which the back of the dummy is not in contact with the chair (indicated by the symbol ■ in the figure), and further to a state in which the dummy has moved forward and is seated on the front end portion of the seat of the chair (indicated by the symbol ● in the figure). From this, it has been found necessary to always keep the same seating posture of the dummy. Since persons normally are seated on theater chairs in the posture in which they are in close contact with the theater chair, it is desirable to measure the sound absorption power with the dummy sound absorber seated in this posture.

Figure 11A:
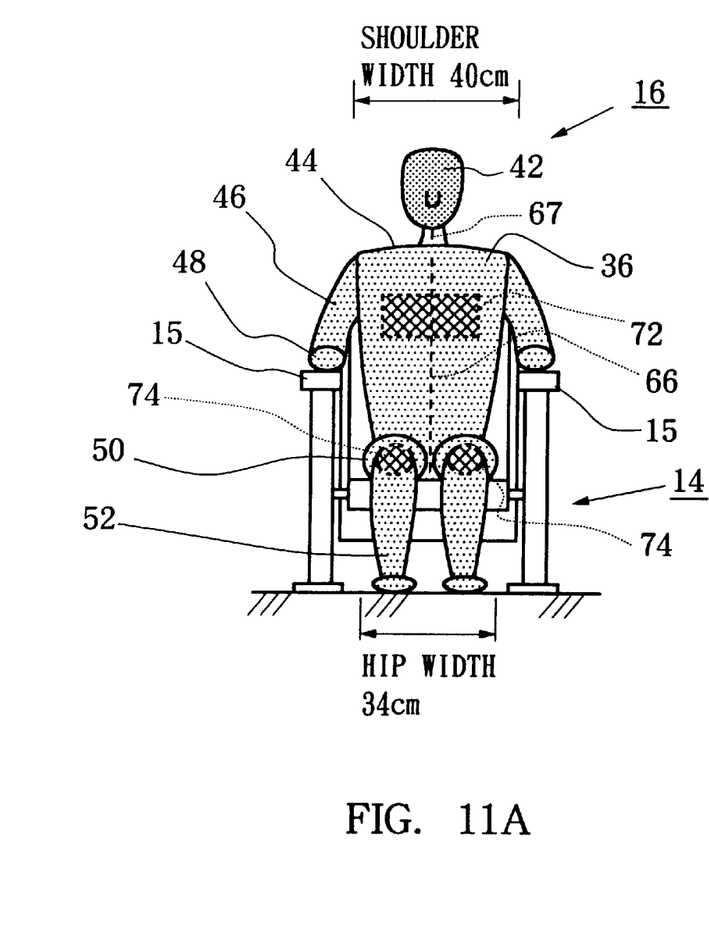
Figure 11B:
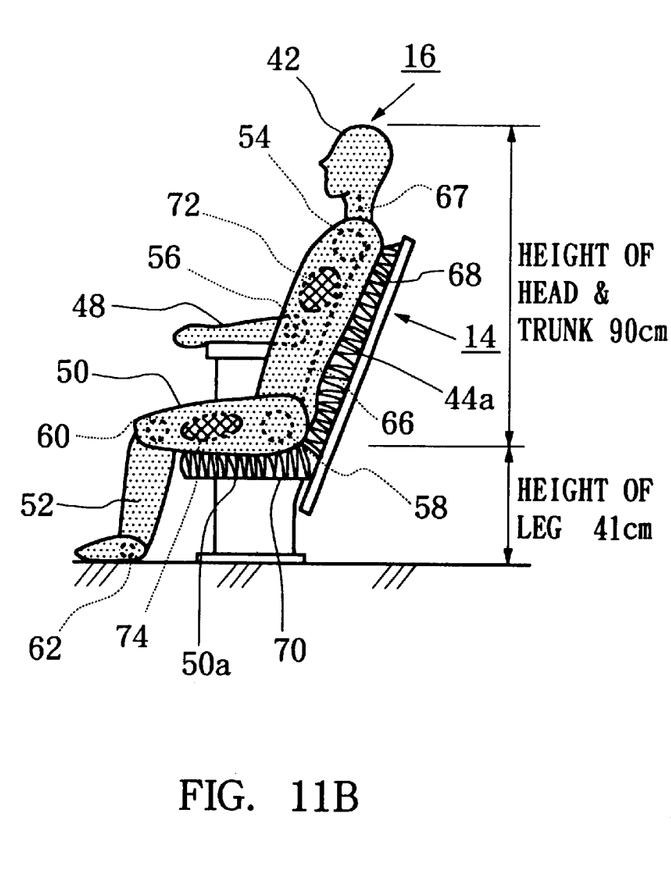

An embodiment of a dummy sound absorber satisfying the above factors (1) to (4) is shown in FIGS. 11A and 11B. This dummy sound absorber 16 is made of foamed polystyrene used as a non-sound absorbing material and has the shape of a human being. That is, the dummy 16 has a head 42, a trunk 44, upper arms 46, forearms 48, thighs 50 and legs 52. The upper arms 46 and the forearms 48 may be provided only when the elbow seats 15 of a chair 14 are made of sound absorbing cushions. Sizes of the dummy 16 are determined to standard sizes of an adult male, i.e., the height of head and trunk is 90 cm, the height of legs is 41 cm, the width of shoulders is 40 cm and the width of hips in the seated position is 34 cm for an average Japanese adult male. The entire surface of the dummy is covered with a porous sound absorbing material 36 such as foamed polyurethane which constitutes the sound absorption power of a human being per se. The dummy 16 is covered with a cloth which is put on the porous sound absorbing material 36.

Movable portions are provided in the dummy 16 so that it can assume a seated posture. More specifically, joints 54, 56, 58, 60 and 62 are provided in the shoulders, elbows, hips, knees and ankles. A flexible member 66, such as a metal wire which can flexibly change its shape, is buried in the back portion of the trunk 44 in such a manner that the back of the dummy 16 can be brought into close contact with the back 68 of the hall chair 14. A flexible member 67 is also buried in the neck of the dummy 16 so that the inclination of the head 42 can be adjusted freely.

A weight 72 is buried in the trunk 44 and a weight 74 is buried in the thighs 50. The weights 72 and 74 constituting the pressing force generation means impart the cushions of the back 68 and a seat 70 of the chair 14 with loads which are substantially equivalent to loads imparted by the human being when he is seated on the chair 14. The weights 72 and 74 may be made, for example, of iron blocks or iron plates. Assuming, for example, that the weight of the human being seated on the chair 14 is 58.8 kg and that the ratio of the weight of the trunk of the human being to the weight of his whole body is 0.54, weight W1 of the weight in the trunk 44 is determined, for example, to W1=58.8 kg×0.54=32 kg. for average Japanese men.

Assuming also that the ratio of the weight of one thigh of the human being to the weight of his whole body is, for example, 0.07, weight W2 of the weight 74 in the thigh 50 is determined, for example, to W2=58.8 kg×0.07=4 kg.

By adjusting the angles of the joints 54, 56, 58, 60 and 62 and the bending states of the flexible members 66 and 67 of the dummy 16, the dummy 16 can be seated on the chair 14. In the seated state, a back 44a of the trunk 44 which constitutes a part of the chair contacting portion is brought into close contact with the back 68, and the lower surfaces 50a of the thighs 50 which constitute also a part of the chair contacting portion are brought into close contact with the seat 70. The weights 72 and 74 act to impart the cushions of the back 68 and the seat 70 with a pressing force which is substantially equivalent to the pressing force imparted when the human being is seated on the chair 14. By this arrangement, measurement of the sound absorption power can be effected in substantially the same conditions as when the human being is actually seated on the hall chair 14.

Figure 12:
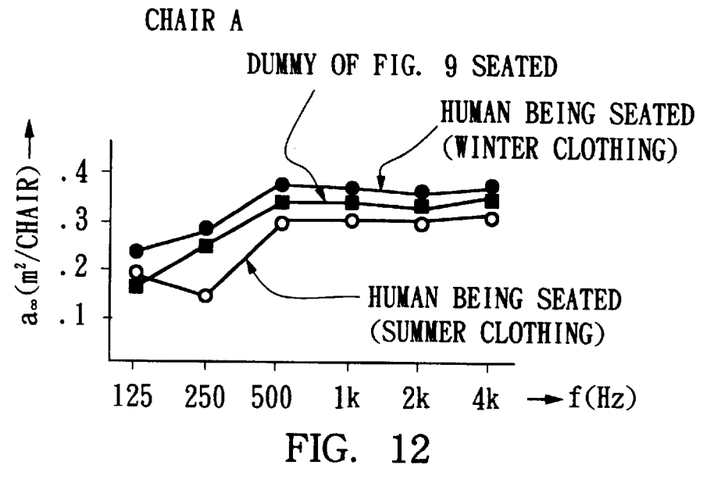
FIG. 12 is a graph showing results of measurement of a sound absorption power by the dummy of FIGS. 11A and 11B.

Results of measurement made by the method described with reference to FIGS. 1A and 1B with the dummy of FIGS. 11A and 11B seated on chair A as well as results of measurement made when the human being is actually seated on chair A are shown in FIG. 12. These results indicate that the sound absorption capacity of the dummy 16 lies midway between the sound absorption capacity of a human being wearing summer clothing and the sound absorption capacity of a human being wearing winter clothing and, therefore, is preferable as a standard dummy sound absorber.

Figure 13A:
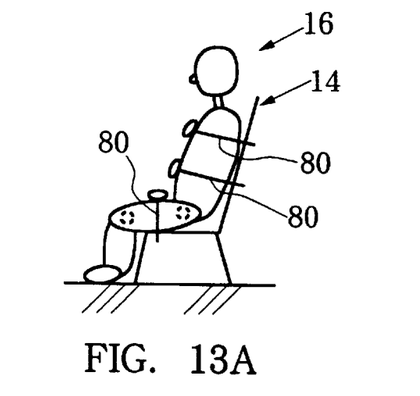
FIGS. 13A and 13B are diagrams showing another example of the pressing force generation means.
Figure 13B:
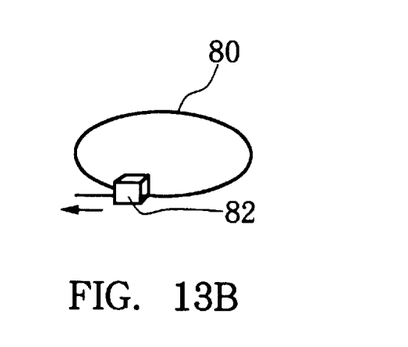

In the above described embodiment, weights are buried in the dummy as the pressing force generation means. There may however be a case where it is inconvenient to carry and handle a dummy sound absorber having a weight equivalent to that of a human body. For coping with such a case, as shown in FIG. 13A, the pressing force may be generated by binding portions such as the trunk and thighs of a dummy sound absorber 16 by means of wires 80 or the like. In this case, a fastener 82 shown in FIG. 13B or like fastening means may be used. By adjusting the binding condition of the wires 80 by operating the fastener 82, the pressing force can be adjusted to a desired value. The fastener 82 may be provided on the dummy 16 as one of its component parts. In FIGS. 13A and 13B and subsequent figures, the same component parts as those in FIGS. 11A and 11B are designated by the same reference characters and description thereof will be omitted.

Figure 14A:
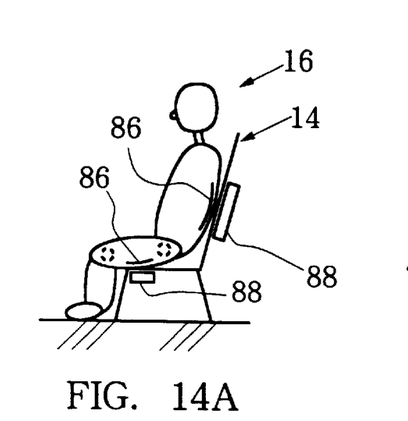
FIGS. 14A and 14B are diagrams showing another example of the pressing force generation means.
Figure 14B:
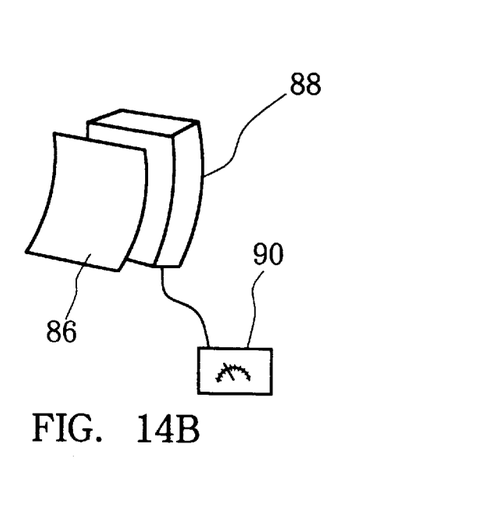

Alternatively, as shown in FIG. 14A, iron plates 86 having proper areas may be buried in the dummy 16 and the pressing force may be generated by attracting these iron plates 86 by magnets 88 provided outside of the dummy 16. If an electromagnet is used as the magnet 88 as shown in FIG. 14B, the magnetic attraction can be determined to a desired value by operating a magnetic attraction adjusting device 90.

Figure 15A:
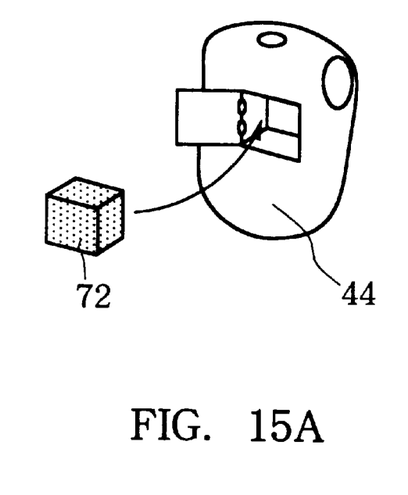
FIGS. 15A and 15B are diagrams showing examples of detachable weights.
Figure 15B:
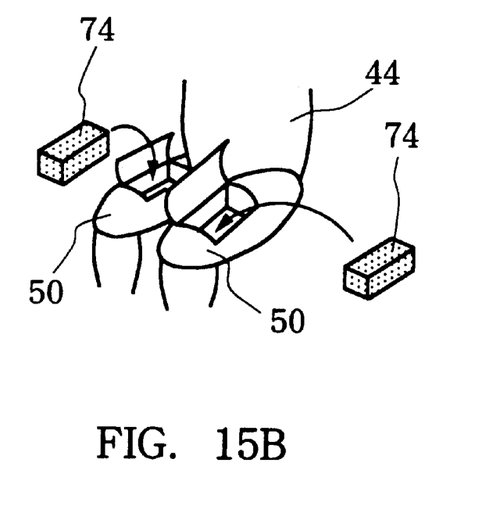

In the case of using weights as the pressing force generation means, it becomes easier to carry the dummy by constructing the dummy so that, as shown in FIGS. 15A and 15B, weights 72 and 74 can be inserted into and detached from the trunk 44 and thighs 50 of the dummy.

In the above described embodiment, the main body of the sound absorption dummy 16 is made of foamed polystyrene. Alternatively, the main body of the dummy 16 may be made of other non-sound absorbing material such as silicon or plaster. When plaster, which is a relatively heavy material, is used for making the main body, the use of the weights may be eliminated or reduced.

In the above described embodiment, the entire surface of the dummy 16 is covered with a sound absorbing material. Alternatively, the dummy 16 may be covered with the sound absorbing material only in a portion which is exposed outside in the seated state of the dummy 16. If the main body of the dummy 16 is made of a material having a sound absorption capacity which is close to that of a human being, it will not be necessary to cover the main body with a sound absorbing material.

Figure 16A:
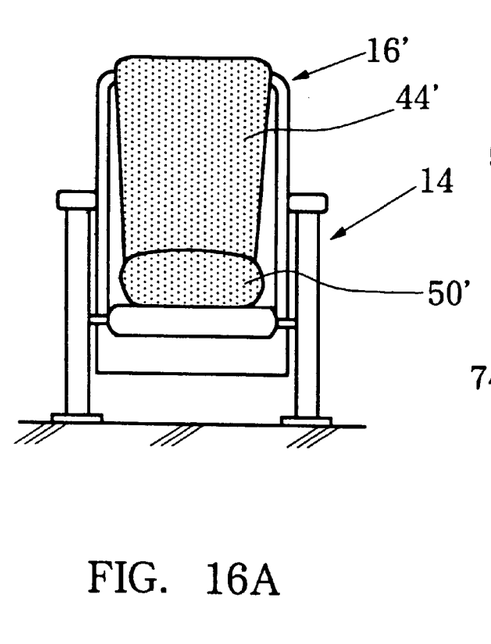
FIGS. 16A and 16B are diagrams showing another embodiment of the sound absorption dummy according to the invention.
Figure 16B:
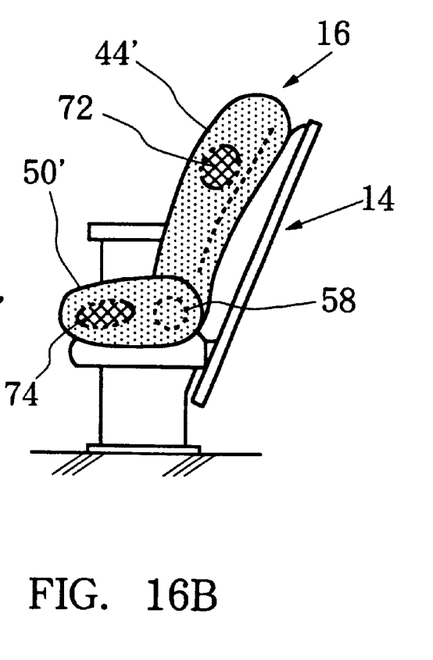

In the above described embodiment, the sound absorption dummy 16 simulating a human body is used. However, portions of the dummy which do not influence results of the measurement of the sound absorption capacity very much may be omitted. It is essential that the dummy sound absorber should satisfy the above described factors (1) to (4) and, for this purpose, as shown in FIGS. 16A and 16B, a dummy sound absorber 16' may be constructed of only a portion 44' corresponding to a trunk and a portion 50' corresponding to the thighs.

The foregoing embodiments have been described with reference to the measurement of sound absorption power of the existing hall chair. The invention can be effectively applied to the designing of a theater chair with a constant sound absorption power capable of maintaining acoustic characteristics of a hall unchanged.

As a characteristic of a theater chair with a constant sound absorption power, the chair is required to have a small sound absorption power and have little change in sound absorption power by seating thereon. More specifically, the theater chair with a constant sound absorption power is a chair which can be defined in the following manner:

A theater chair with a constant sound absorption power is a chair whose sound absorption power per one chair when the chair is empty obtained by measuring by the random incident sound absorption coefficient measuring method on the assumption that chairs which are arranged in parallel on a flat floor in such a manner that geometrical relations of these chairs to one another is substantially the same as that of chairs arranged in a theater are a flat sound absorption material, and whose total "sound absorption power" per one chair and one human being when he is seated on the chair determined on the condition that an adult male wearing between-season wear (meaning a human body having weight of about 65 kg and whose sound absorption power is about 0.3 m² (metersabine) at a frequency of 500 Hz when seated alone) is seated on the chair in a natural posture or on a similar condition are respectively 0.4 m² (metersabine) or below and, when frequency bands from 125 Hz to 4 kHz are divided by one octave band and sound absorption power of an empty chair and that of a seated chair are measured, change between the empty chair and the seated chair in each band is 10% or below of sound absorption power of the empty chair.

As to these values of sound absorption power, reference should be made to the following literature:
(1) "ACOUSTICS" Leo L. Beranke, Pages 300–301, McGRAW-HILL BOOK COMPANY, 1954
(2) "Acoustic Designing in Architecture", Vern O. Knudsen and Cyril M. Harris, Pages 170–175, published by the American Institute of Physics for the Acoustic Society of America, 1980
(3) "Reverberation time difference limeus in the simulated sound field of an actual hall", Y. Tahara and T. Miyajima, Pages 527 and 528, published by The Acoustical Society of Japan, March 1988

Figure 17:
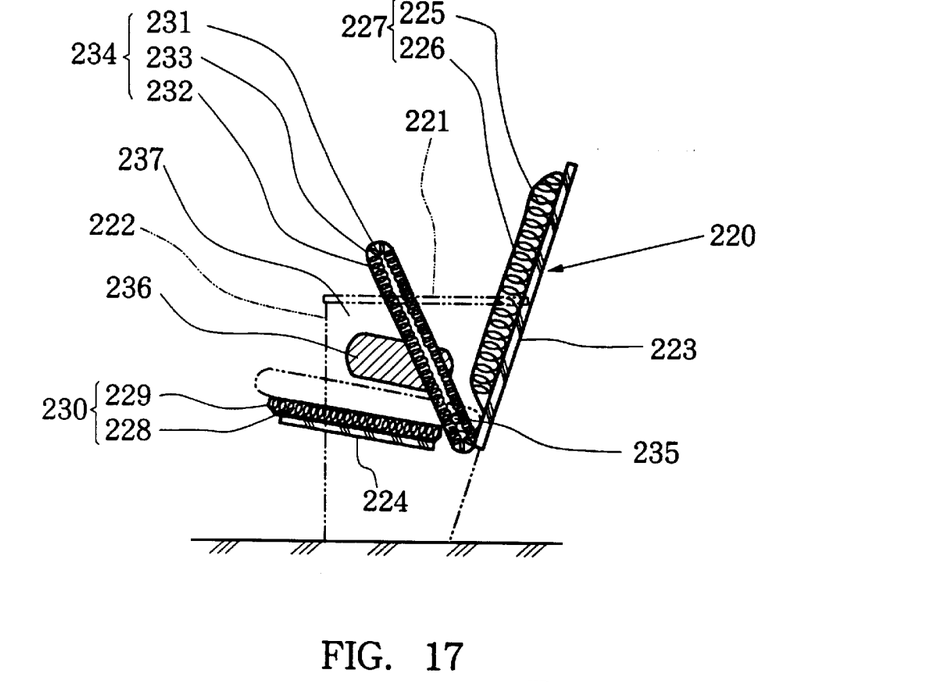
FIG. 17 is a view showing a specific example of the theater chair with a constant absorption power.

A specific example of the theater chair with a constant sound absorbing power satisfying the above described definition will be described. This theater chair is constructed in such a manner that sound absorption power concentrates on the seat and the back which are concealed by seating of a human being and the chair has a third sound absorption surface which is exposed when the human being leaves the chair. FIG. 17 shows this example.

In FIG. 17, the chair has a support 220. The support 220 has a pair of side plates 222 which have elbow rests 221 at the top end thereof and are fixed to the floor in an upright state, a back plate 223 which bridges the rear edges of the side plates 222, and a lower plate 224 which is disposed in a horizontal posture and fixed to the the side plates 222 at their central portions. These side plates 222, back plate 223 and lower plate 224 are all made of a material which reflects sound.

A cushion 225 made of a material having elasticity and sound absorption power such as polyurethane or glass wool is fixedly secured on the front surface of the back plate 223 and a decorative cloth 226 is provided on the surface of the cushion 225 to form a back rest 227. Similarly, a fixed seat 230 including a cushion 228 and cloth 229 is provided on the upper surface of the lower plate 224. The surfaces of the back rest 227 and a fixed seat section 230 have sound absorption power. The fixed seat section 230 may be constructed as a sound absorbing trap structure to improve the sound absorption power.

On the other hand, there is provided on the fixed seat section 230 a movable seat section 234 which includes cushions 232 fixed on both surfaces of a core 231 and is covered with cloth 233 in its entire surface. The rear end portion of the movable seat section 234 is rotatably supported by a horizontal shaft 235 which bridges the side plates 222 in the vicinity of the rear end portion of the fixed seat section 230. An unillustrated energizing means is provided in the movable seat section 234 and the movable seat section 234 is thereby caused to spring up to a position at which the movable seat section 234 does not reach the back rest 227 as shown in the figure when the chair is empty.

On the inside surface of each side plate 222 is formed a sound absorbing section 236 at a position opposite to the hip and thigh of a human being in the seated position. The sound absorbing section 236 includes a cushion covered with cloth. On the rest of the inside surface of each side plate 222 is secured a reflective material 237 which reflects sound.

Figure 18:
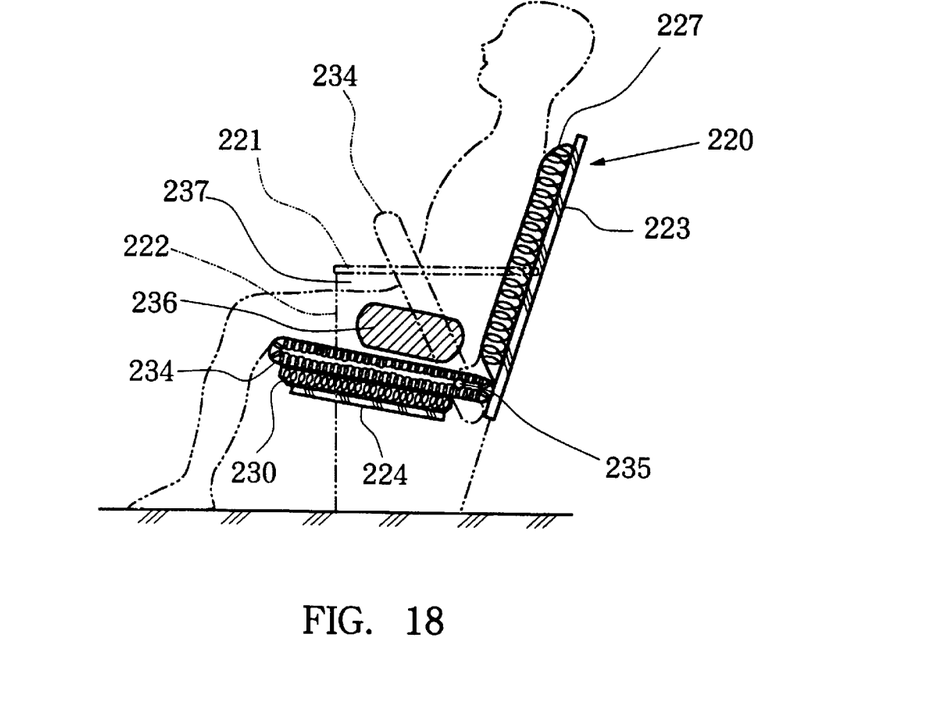
FIG. 18 is a view showing the state of use of the chair.

In the theater chair with a constant sound absorption power, when the seat is empty, the movable seat section 234 is supported at the position where the movable seat section 234 has sprung up from the fixed seat section 230 and therefore the sound absorbing lower surface of the movable seat section 234 and the sound absorbing upper surface of the fixed seat section 230 are exposed so that the sound absorption power of the chair as a whole is relatively large. When the human being is seated on the chair, as shown in FIG. 18, the movable seat section 234 is pressed on the fixed seat section 230 whereby the lower surface of the movable seat section 234 and the upper surface of the fixed seat section 230 are closed and the front surface of the back rest 227, the upper surface of the movable seat section 234 and the sound absorbing section 236 of each side plate 222 are covered by the human body. Therefore, relation between sound absorption power B of the chair as a whole in the seated state and sound absorption power A of the chair as a whole in the empty state is expressed by the following equation:

$$B = A + (1) - (2) - (3)$$

where (1) represents sound absorption power of the surface of the human being which is not in contact with the chair and sound absorption power of the surface of the chair which is not in contact with the human body, (2) represents sound absorption power of a portion of either the back rest 227, movable seat section 234 and sound absorbing section 236 of the side plates 222 which portion is not covered by the human body in the seated state, and (3) represents sound absorption power of portions of the movable seat section 234 and the fixed seat section 230 which are in abutting contact with each other in the seated state.

Accordingly, by determining the sound absorption power to satisfy the relation (1)=(2)+(3), the acoustic characteristic of the hall both in the empty state and the seated state can be maintained substantially constant. Particularly in this embodiment, the area and sound absorption power of the portion (3) can be set at large values, and then it is easy to realize the relation of (1)=(2)+(3).

In this embodiment, the chair is of a simple construction in which the seat is composed of the fixed seat section 230 and the movable seat section 234 with the movable seat section 234 being rotatable about the horizontal shaft and, accordingly, this chair is less expensive and more accurate in operation than a conventional chair incorporating a slidable shield plate. Besides, the chair of this embodiment has less restriction to the configuration of the back rest 227 and the seat section 230 and, therefore, a shape such as one having many curved surfaces can be easily adopted. Thus, the chair of this embodiment has a large degree of freedom in design. Further, since the movable seat section 234 can be maintained in the sprung up position in the empty state, a cushion effect can be obtained by the rotation of the movable seat section 234 when the human being sits on the chair and this gives comfort to the sitting human being.

Figure 19:
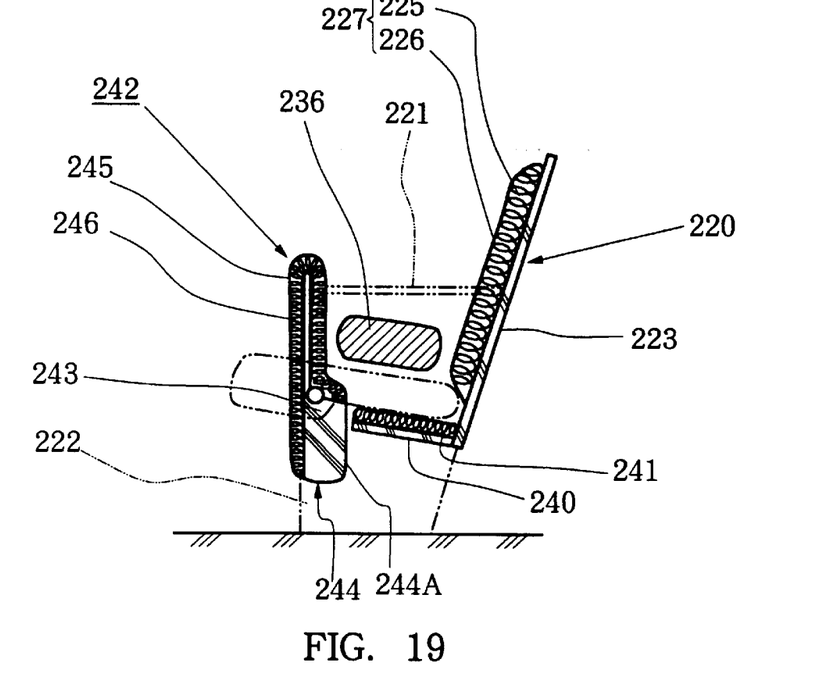
FIG. 19 is a view showing another specific example of the theater chair with a constant absorption power.
Figure 20:
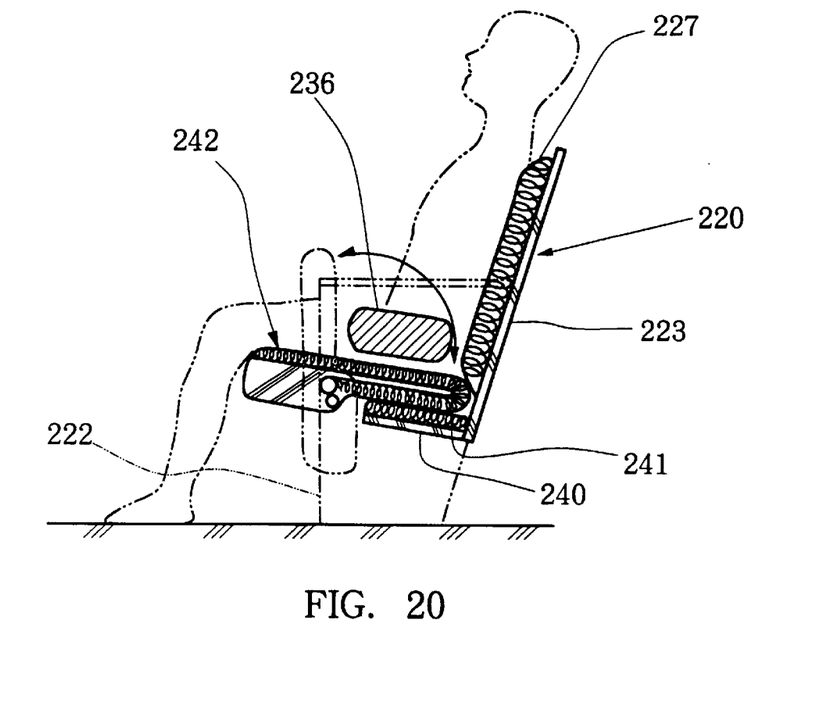
FIG. 20 is a view showing the state of use of the chair.

FIG. 19 shows another example of a theater chair with a constant sound absorption power. In this example, a lower plate 240 and a fixed seat section 241 have a smaller width in the fore and aft direction than the above described embodiment of FIG. 17. In this embodiment, the movable seat section 242 is supported rotatably on a horizontal shaft 243 which bridges side plates 222 at their front central portions. The movable seat section 242 includes a sound reflecting plate-like core 244 having a sound reflecting projection 244A in the lower front end portion, a cushion 245 and cloth 246 attached to the core 244 excepting the projection 244A. The movable seat section 242 is provided with unillustrated energizing means so that the movable seat section 242 is caused to spring up to an upright position in the empty state whereas, in the seated state, the movable seat section 242 is rotated rearwardly as shown in FIG. 20 with the lower surface of the rear end portion of the movable seat section 242 being brought into close contact with the upper surface of the fixed seat section 241. The other portions are the same as or similar to the chair shown in FIG. 17.

In the chair of FIG. 19, a sound absorption power adjusting effect similar to that of the chair of FIG. 17 can be obtained. Moreover, since the movable seat section is rotated rearwardly, the human being can sit on the chair by just standing in front of the chair and then sitting down and, therefore, the movable seat section 242 can be rotated smoothly without using the human hand.

Further, in this chair, the movable seat section 242 erects uprightly along the front edge of the side plates 222 in the empty state and, therefore, a broader space can be provided between one chair and another chair in front in the hall.

What is claimed is:

1. A method for setting sound absorption properties of a chair, the method comprising the steps of:

disposing the chair in a measuring environment;

disposing a dummy sound absorber in the chair, said dummy sound absorber having a shape of a human being and providing a chair pressing force equivalent to the weight of the human being such that the dummy sound absorber simulates a human being seated on the chair;

causing changes in the chair which changes are substantially equivalent to a change in the state of the chair from an unoccupied to an occupied position and a change in the sound absorption properties of the chair caused by the chair becoming occupied;

generating a sound by a sound source away from the chair;

measuring the sound absorption properties of the chair by a PLD/deep-well method; and controlling the sound absorption properties of the chair on the basis of a result of the measuring step.

2. A method for setting sound absorption properties of a chair, the method comprising the steps of:

disposing the chair in a measuring environment;

disposing a dummy sound absorber in the chair, said dummy sound absorber having a shape of a human being and providing a chair pressing force equivalent to the weight of the human being such that the dummy sound absorber simulates a human being seated on the chair;

generating a sound by a sound source away from the chair;

measuring the sound absorption properties of the chair by a PLD/deep-well method; and setting the sound absorption properties of the chair to a predetermined value on the basis of a result of the measuring step.

* * * * *